(12) United States Patent
Doerr et al.

(10) Patent No.: US 7,376,311 B2
(45) Date of Patent: May 20, 2008

(54) METHOD AND APPARATUS FOR WAVELENGTH-SELECTIVE SWITCHES AND MODULATORS

(75) Inventors: Christopher Richard Doerr, Middletown, NJ (US); Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/244,768

(22) Filed: Oct. 6, 2005

(65) Prior Publication Data

US 2007/0140618 A1 Jun. 21, 2007

(51) Int. Cl.
G02B 6/32 (2006.01)
G02B 6/03 (2006.01)

(52) U.S. Cl. ............................ 385/47; 385/18; 385/33; 385/37

(58) Field of Classification Search ................. 385/18, 385/33, 37, 47
See application file for complete search history.

(56) References Cited

U.S. PATENT DOCUMENTS

| | | | | |
|---|---|---|---|---|
| 6,266,464 B1 * | 7/2001 | Day et al. | ...................... | 385/37 |
| 6,807,372 B1 * | 10/2004 | Lee et al. | ...................... | 398/78 |
| 7,257,285 B2 * | 8/2007 | Doerr et al. | ................... | 385/18 |
| 7,283,709 B2 * | 10/2007 | Doerr et al. | ................... | 385/47 |
| 7,289,697 B2 * | 10/2007 | Dorrer et al. | .................. | 385/18 |
| 2004/0252938 A1 * | 12/2004 | Ducellier et al. | ............. | 385/27 |
| 2004/0258351 A1 | 12/2004 | Ducellier | | |

FOREIGN PATENT DOCUMENTS

WO WO 03/098961 A2 11/2003

OTHER PUBLICATIONS

"Compact, wavelength-selective 1×2 switch utilizing a planar lightwave stack and a MEMS micromirror array," by D. M. Marom and C.R. Doerr, published in Optical MEMS Conference in Aug. 2004.

* cited by examiner

*Primary Examiner*—Sung Pak
*Assistant Examiner*—Jerry T. Rahll

(57) ABSTRACT

An apparatus and method are provided for manipulating light beams propagated through an optical apparatus that includes a planar lightwave circuit (PLC) and free-space optics unit. A multi-wave optical signal coupled to the PLC is propagated through a first and second waveguide array to generate a phased array output at an edge facet of the PLC. The phased array output at the edge facet is spatially Fourier transformed by the lens to generate a spectrally resolved image having a discrete light spot for each channel of the input optical signal, which is coupled to a pixelated optical receiving unit. When the optical receiving unit is a reflector, one or more of the discrete light spot are reflected to a desired waveguide array of a PLC to produce a desired output. When the optical receiving unit is a pixelated transmissive modulator, one or more of the discrete light spot are modulated as they pass through the modulator.

9 Claims, 7 Drawing Sheets

METHOD AND APPARATUS FOR WAVELENGTH-SELECTIVE SWITCHES AND MODULATORS

CROSS-REFERENCE TO RELATED APPLICATIONS

This application is related to U.S. patent application Ser. No. 10/930,382, filed Aug. 31, 2004, which is incorporated by reference herein.

FIELD OF THE INVENTION

The present invention relates to optical components that utilize spatially distributed light, and more particularly to a method and apparatus for implementing pixelated wavelength-selective switches (WSS) and modulators

BACKGROUND OF THE INVENTION

Optical components that switch and/or attenuate selected channels (hereinafter wavelength selective switch, WSS) in wavelength-division multiplexed (WDM) communications are useful in constructing optical mesh networks and reconfigurable optical add/drop multiplexers (ROADM). With reference to FIG. 1, a typical WSS is depicted by 100. WSS 100 is implemented in a hybrid planar lightwave circuit (PLC) 120 and free-space optics configuration 160 (described in previously referenced U.S. patent application Ser. No. 10/930,382 and the article "Compact, wavelength-selective 1×2 switch utilizing a planar lightwave stack and a MEMS micromirror array," by D. M. Marom and C. R. Doerr, published in Optical MEMS Conference in August 2004). WSS 100 includes dispersing means PLC 120 for spatially dispersing the optical signal (e.g., a WDM signal) from the input fiber 115 and projecting the dispersed light through a lens 135 onto a spatial light modulating (SLM) device 140. The SLM device 140 is typically comprised of an array of individual pixels, where each pixel is assigned to a particular wavelength channel or band of channels and can either attenuate the optical signal (for an optical channel blocker) or switch the optical signal onto an output fiber (for a WSS). The SLM technology commonly used for such optical components is based on either liquid crystals or microelectromechanical system (MEMS)-based micromirrors.

While each channel of the optical signal is directed to an assigned pixel, undesirably, some spectral components of the channel may fall on the edge of the pixel, especially in systems with high spectral efficiency. The diffraction phenomena from the edge can result in some deleterious effects, such as coupling the light to undesirable locations. (See article "Attenuated mechanism effect on filter shape in channelized dynamic spectral equalizers," by S-H. Oh and D. M. Marom, published on Jan. 1, 2004 in Vol. 43, No. 1, APPLIED OPTICS) Hence beams of light of frequency components that are incident on the interpixel gap region represent a special challenge to the optical design of the WSS. Furthermore, when SLM 140 is a MEMS structure, each pixel's micromirror will have a finite curvature. This curvature will cause the reflected light to reflect in slightly different directions depending on small changes in wavelength (see article "Effects of mirror curvature in MEMS micromirror based wavelength-selective switches" by D. M. Marom et al, published in 2003 LEOS annual meeting, Tucson, Ariz., October 2003.). Therefore strict bounds are set on the minimum acceptable micromirror curvature, which represents a challenge for metalized mirrors due to stresses and coefficient of thermal expansion mismatches.

What is desired is an improved WSS design, which solves both the problem of light falling on pixel edges and finite micromirror curvature.

SUMMARY OF THE INVENTION

This invention describes a solution to the issues associated with light falling on pixel edges and finite micromirror curvature by generating light signals that are not linearly dispersed on the SLM. Rather the light signals are directed as discrete spots on the SLM by employing a PLC with two waveguide arrays as wavelength dispersing means. As a result, each finite wavelength band (channel separation or grid) of a multi-wave input signal forms a discrete light spot that falls more centrally within an assigned pixel of the SLM device. Illustratively, the SLM device can be a micromirror reflector that reflects and/or modulates selected discrete light spots with reduced sensitivity to micromirror curvature effects and prevents light from falling on micromirror edges or in the intergap regions between the micromirrors. The SLM device can also be a pixelated transmissive modulator (that modulates selected discrete light spots passing through the modulator) so that no light falls on pixel edges or in the intergap regions between the pixels. Thus the invention can be used to construct optical apparatus that operates on discrete channel bandwidth signals, as is found in DWDM systems which require channel blockers or wss.

More particularly, our invention is directed to an optical apparatus for receiving a multi-wave input optical signal comprising:
  a first planar lightwave circuit (PLC) including
    an input/output waveguide,
    a first waveguide array coupled to the input/output waveguide, the first waveguide array having at least two waveguides and having a free-spectral range equal to a channel or band of channels separation of the input optical signal, the first waveguide array introducing a first dispersion into the input optical signal,
    a second waveguide array coupled to the first waveguide array, the second waveguide array having a plurality of waveguides terminating at an edge facet of the PLC and having a free-spectral range equal to all of the channels of the input optical signal, wherein the second waveguide array produces a second dispersion into the input optical signal which adds onto the first dispersion;
  a lens adjacent to the PLC; and
  an optical receiving unit adjacent to the lens;
  wherein the edge facet of the PLC and the optical receiving unit are respectively positioned at a front focal plane and a back focal plane of the lens such that input optical signal is propagated through the PLC to generate a phased array output at the edge facet of the PLC, the phased array output is spatially Fourier transformed by the lens to generate a spectrally resolved image having a discrete light spot for each channel or band of channels of the input optical signal which is coupled to the optical receiving unit.

In accordance with the present invention, we also describe a method of operating an optical switch comprising the steps of (1) receiving a multi-wave light signal into a waveguide of a wavelength selective switch; (2) coupling the light beam into a first waveguide array having a free-spectral range equal to the channel separation of the multi-wave light signal and which introduces a first dispersion into the multi-wave light signal; (3) coupling the light beam from the first waveguide array to a second waveguide array having a free-spectral range equal to all of the channels of the multi-wave light signal and that introduces a second dispersion into the multi-wave light signal which adds onto the first dispersion, the second waveguide array terminates at an edge facet and generates a phased array output; and (4) spatially Fourier transforming the phased array output using one or more lenses to generate a spectrally resolved image having a discrete light spot for each wavelength component of the multi-wave light signal.

BRIEF DESCRIPTION OF THE FIGURES

Other aspects, features, and advantages of the present invention will become more fully apparent from the following detailed description, the appended claims, and the accompanying drawings in which:

DETAILED DESCRIPTION

Figure 1A:
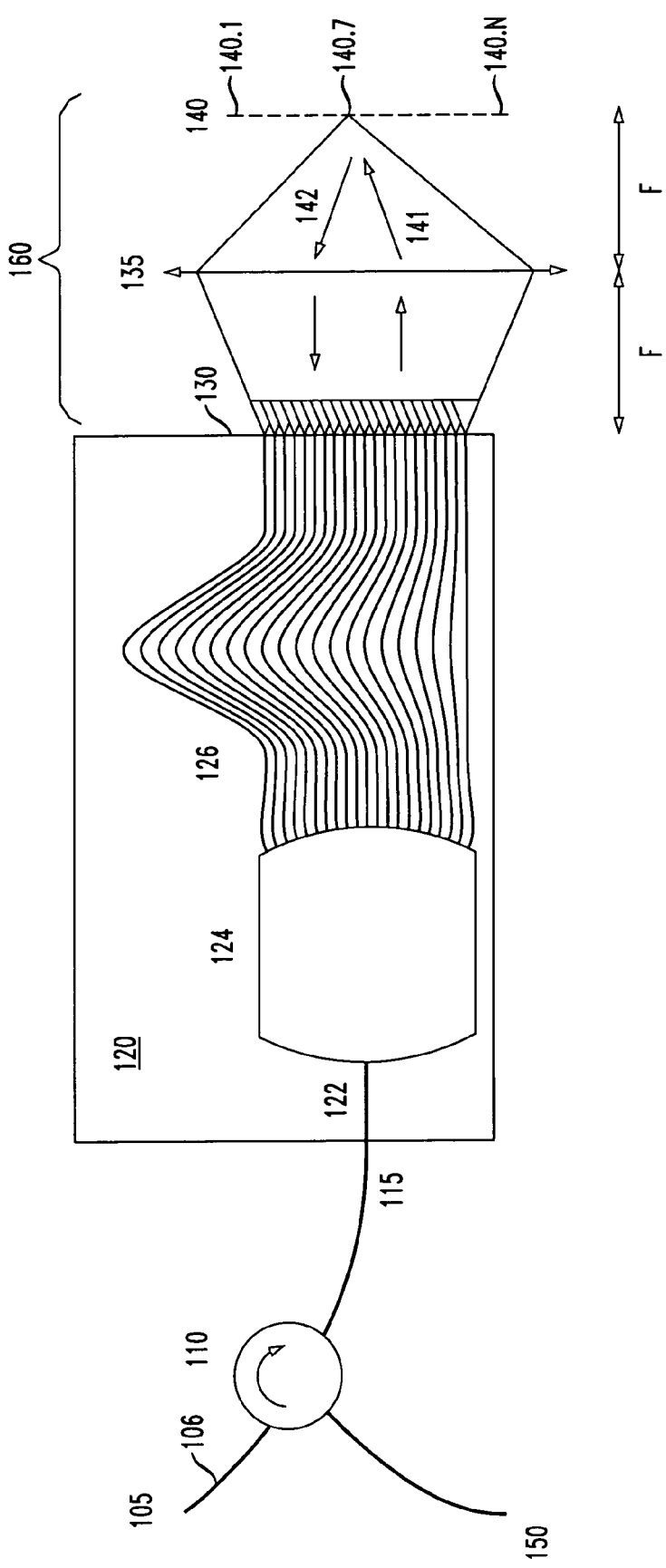
FIG. 1A is an illustration of prior art WSS operated as a channel blocker implemented using a hybrid configuration of PLC and free-space optics with an SLM.

Shown in FIG. 1A is a prior art embodiment of a WSS 100 implemented in a hybrid planar lightwave circuit (PLC) 120 and free-space optics configuration 160. Such a WSS 100 functions as a wavelength router as described in the previously reference U.S. patent application Ser. No. 10/930,382, which is incorporated by reference herein. An optical input signal 105 (e.g., a WDM signal) received by input fiber 106 is coupled to and traverses an optical circulator 110 and is coupled via optical fiber 115 to a dispersing means, PLC 120. PLC 120 consists of a waveguide 122, coupler (e.g., a star coupler) 124, and waveguide array 126. The optical signal is distributed on all waveguides in waveguide array 126 via coupler 124. The waveguides in waveguide array 126 are incrementally longer, such that at their output, at edge facet 130 of PLC 120, each waveguide introduces a different delay. Hence the light radiating from the edge facet 130 of PLC 120 has a unique phased array relationship that will assist in dispersing the frequency components of the light. The free-space optics configuration 160 includes a lens 135 and a reflector device 140. The lens 135 is preferably positioned so that the edge facet 130 is located at its front focal plane of lens 135 (at focal distance F) and SLM 140 is located at its back focal plane. Lens 135 performs a spatial Fourier transform, such that at its back focal plane the light is linearly dispersed and incident upon SLM 140. SLM 140 consists of an array of discrete pixels, each of which can be independently controlled and set to modulate light falling on it. SLM 140 can utilize MEMS micromirrors or liquid-crystal based modulators. The phased array relationship of PLC 120 and the spatial Fourier transform by lens 135 enable the light beams of each wavelength channel or band of channels of the optical input signal 105 to be directed to a different pixel on SLM 140. FIG. 1A illustrates the incident light beam 141 from a particular wavelength being directed onto its associated pixel 140.7. The incident light beam 141 is modulated by SLM 140 to form the reflected light beam 142 that traverses back through lens 135, couples into PLC 120 and emerges on fiber 115 where circulator 110 direct the output light to fiber 150.

Figure 1B:
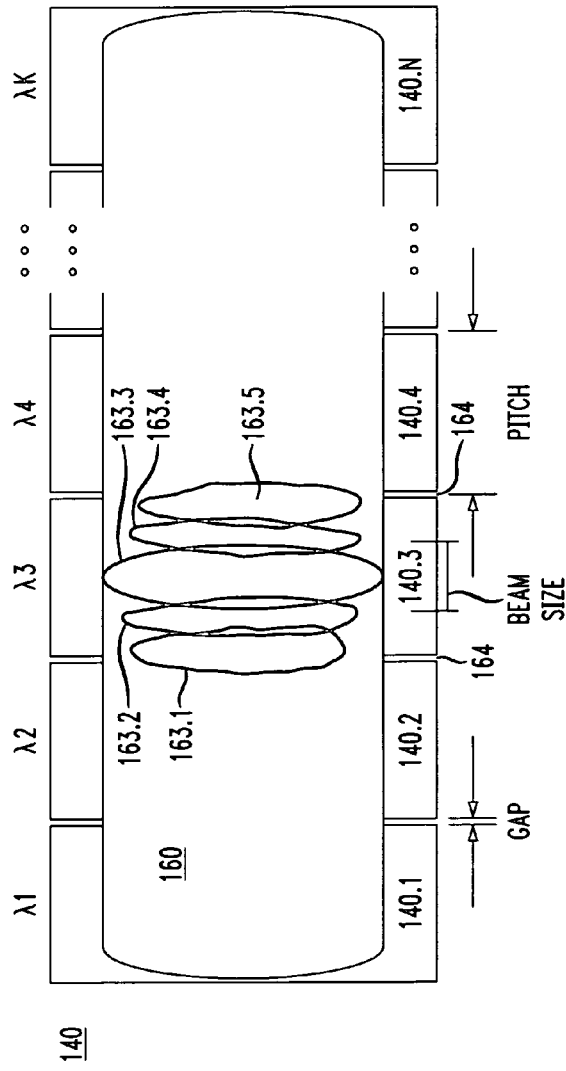
FIG. 1B shows the resulting linearly dispersed optical signal on the SLM using the prior art WSS of FIG. 1A.

All of the wavelengths of optical input signal 105 after passing through WSS 100 form a linear dispersed optical signal on SLM 140. With reference to FIG. 1B, the linear dispersion results in a input signal 105 (for example, a broadband WDM signal) appearing as a linearly dispersed continuous beam 160 on SLM 140. Since each of the wavelengths of the input signal 105 are typically modulated, each modulated wavelength produces a plurality of elliptical Gaussian beam mode spots representing spectral components of different intensities (power levels) and bandwidths, possibly including a carrier wavelength spectral component and a spectral component from each of the various modulation products. Shown in FIG. 1B are the beam mode spots of five illustrative spectral components of the modulated wavelength $\lambda 3$, one spot 163.3 represents the carrier wavelength $\lambda 3$ and spots 163.2 and 163.1 represent increasingly higher frequency (lower wavelength) spectral components and spots 163.4 and 163.5 represent increasingly lower frequency (higher wavelength) spectral components. (Note if wavelength $\lambda 3$ is not modulated then only the continuous wave (carrier) signal that forms spot 163.3 will be present) This is for exemplary purposes only, realizing that some transmission formats, such as duobinary, have no carrier. The beam spots of the five illustrative spectral components of modulated wavelength $\lambda 3$ are shown to fall on pixel 140.3 of SLM 140, with the carrier spectral component centered in pixel 140.3. The spectral components spots 163.5-163.1 increase in frequency (from right to left) and have different intensities (not shown) and may overlap into the gap 164 and onto an adjacent pixel 140.2 or 140.4. The combination of all the spectral components of all the modulated wavelengths $\lambda 1$-$\lambda N$ of input signal together form a continuous linear dispersed beam 160. As noted, some of the spectral components of modulated wavelength $\lambda 3$ (and other wavelengths) may fall on two adjacent pixels simultaneously. When this happens, the beam of the particular frequency components that are incident on the pixel edges will exhibit diffraction. This diffraction phenomena can result in some deleterious effects, such as coupling the reflected light to undesirable locations. This will also be of significance to the actual modulator element and its interplay with this diffracted light (see previously referenced APPLIED OPTICS article). Hence beams of light of spectral components that are incident on the interpixel gap region represent a special challenge to the optical design of WSS. Furthermore, when SLM 140 is a MEMS structure, each pixel's micromirror will typically have a finite curvature. This curvature will cause the reflected light to reflect in slightly different directions depending on the wavelength (see previously referenced LEOS article). Therefore strict bounds are set on the minimum acceptable micromirror curvature, which represents a challenge for metalized mirrors due to stresses and coefficient of thermal expansion mismatches.

Figure 2B:
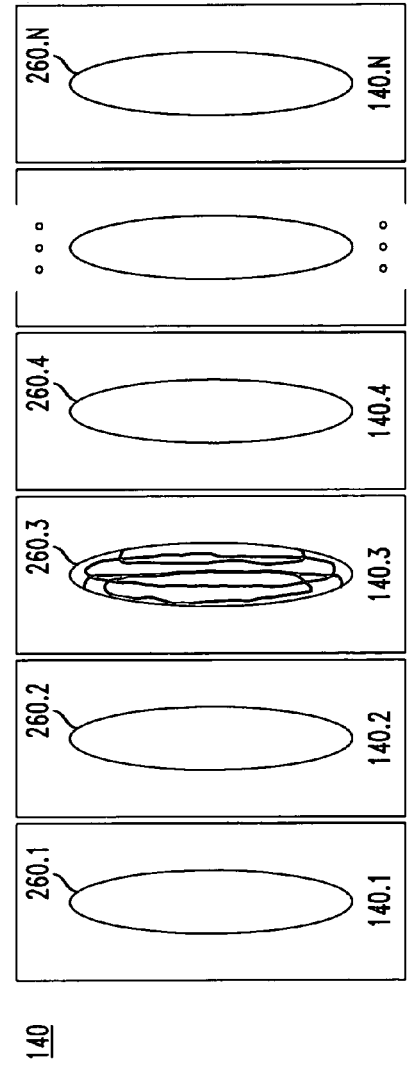
FIG. 2B shows the resulting dispersed discrete light spots on the SLM pixels using our WSS arrangement of FIG. 2A.
Figure 2A:
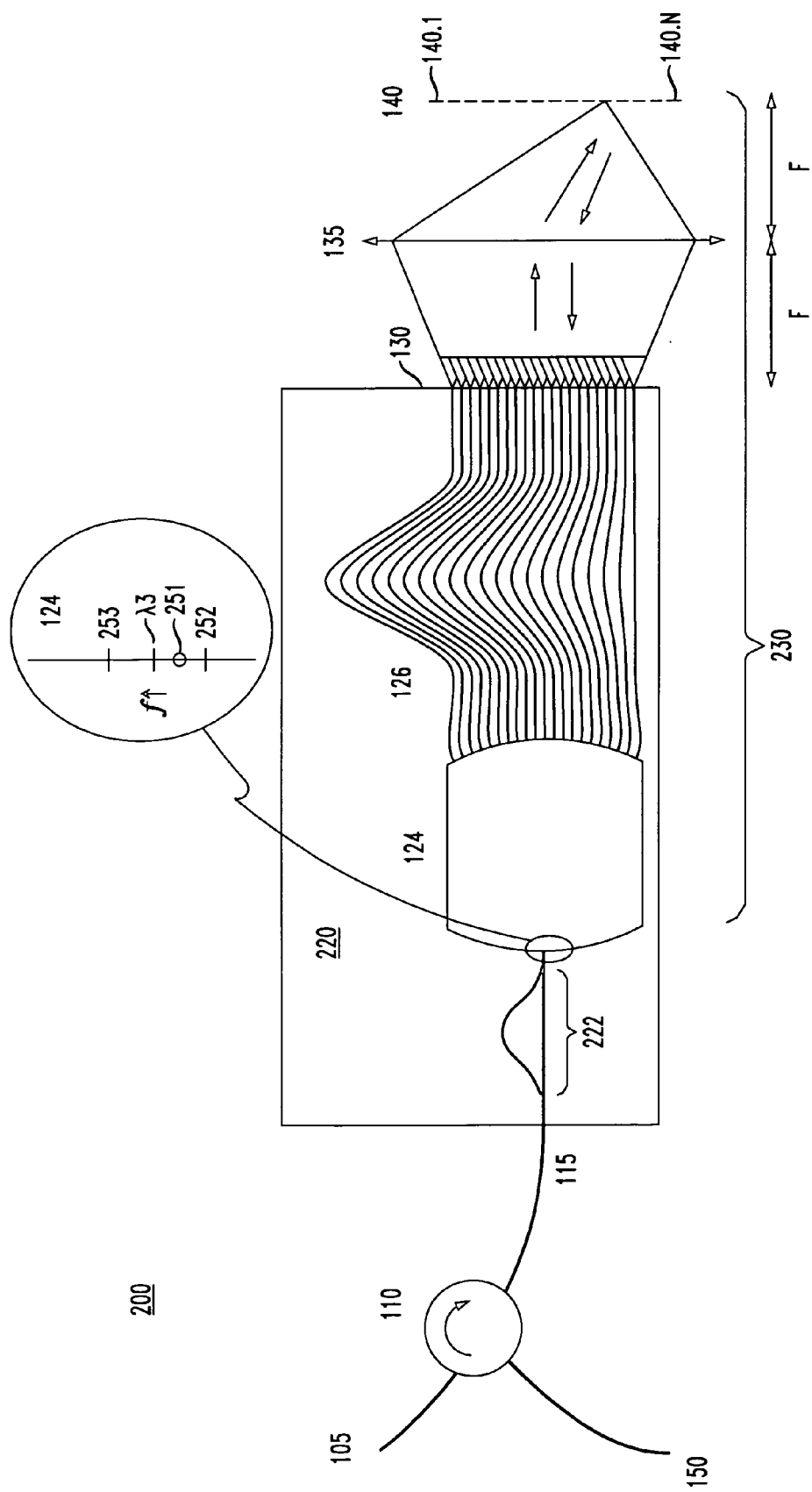
FIG. 2A is an illustration of our inventive WSS arrangement using two waveguide arrays.
Figure 6A:
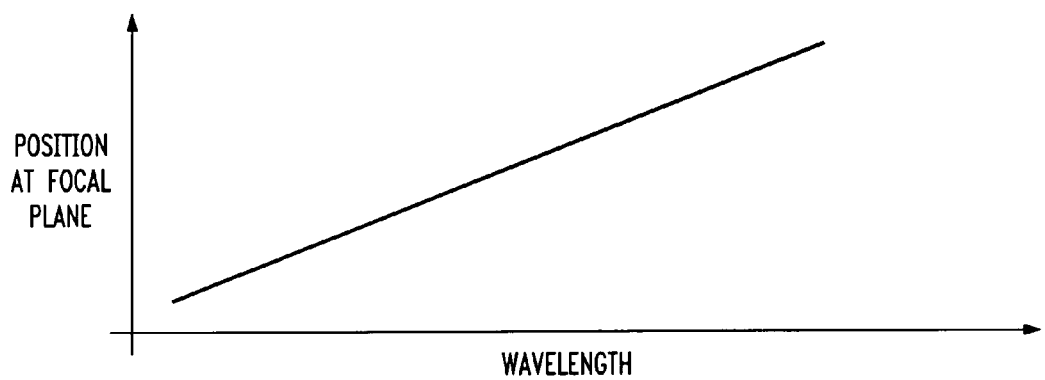
FIGS. 6A and 6B show, respectively, the light position on the SLM versus wavelength for the prior art WSS of FIG. 1A and our WSS arrangement of FIG. 2A.
Figure 6B:
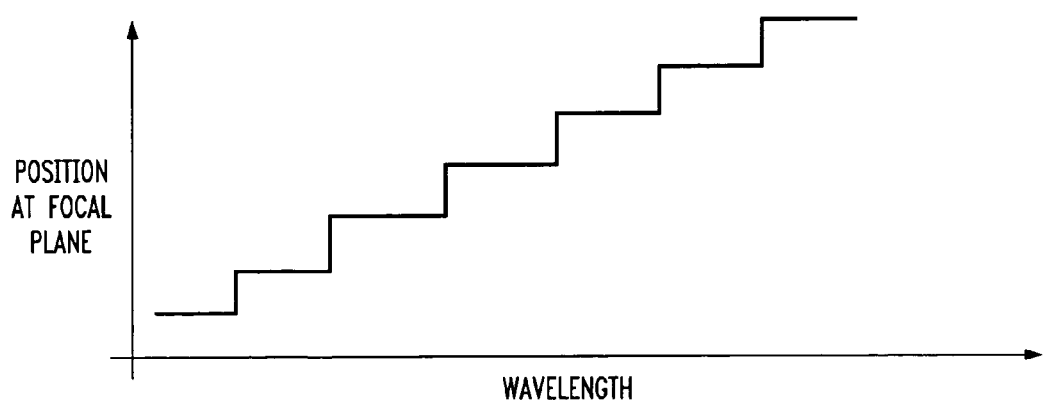

With reference to FIG. 2A, we briefly describe our inventive optical apparatus where the light of the input multi-wave signal is not linearly dispersed as in the prior art, but rather is dispersed to discrete spots onto SLM 140. Each spot contains the light from one channel of the multi-wave signal. Our optical apparatus includes an additional waveguide array 222 to couple light to the hybrid waveguide array 230 (PLC 120 of FIG. 1A). The waveguides (two or more) in the additional waveguide array 222 have different lengths, the length difference setting the free-spectral range (channel separation of the input multi-wave signal) that will set the bandwidth at each of the discrete points in the dispersed light on the SLM 140. The input waveguide array 222 generates a spatial mode at the junction between 222 and 124 that is shifts its location as a function of frequency. The interaction of the moving input spatial mode (produced by input waveguide array 222) together with the linear dispersion (by hybrid waveguide array 230) results in light signal that is dispersed into discrete spots on SLM 140. FIGS. 6A and 6B show, respectively, the light position on SLM 140 versus wavelength for the prior art WSS of FIG. 1A and our WSS arrangement of FIG. 2A. The resulting light dispersing by our optical apparatus into discrete spots lends itself well to optical systems that employ SLM with finite pixels. Since the light is not dispersed linearly and continuously, the light stays away from the pixel edges. This effective "focusing" of all the spectral frequency components of a signal channel onto one discrete spot centrally located on one pixel alleviates the prior art problems of pixel mirror curvature and/or having light incident on the inter-pixel gaps.

Thus in accordance to the present invention, our WSS 200 has made improvements over the design of the WSS 100 of FIG. 1A. This is accomplished by adding another wavelength dispersing means, waveguide array 222, in front of hybrid waveguide array 230. The added waveguide array 222 functions as a wavelength router to synchronously shift (or disperse) the lower and upper frequency spectral components of a modulated wavelength signal in an equal and opposite direction to the linear dispersion produced in the hybrid waveguide array 230. Thus, added waveguide array 222 introduces a first dispersion to the light signal that is then linearly dispersed by hybrid waveguide array 230. The result of the combined two dispersions produces a discrete light spot which includes all the light produced by the various frequency spectral components of a wavelength channel. That is, the light spots from each of the lower and upper frequency spectral components of a wavelength channel have no net dispersion (i.e., they do not change position with frequency) and, hence, they almost coincide exactly with the light spot for the wavelength carrier. This produces one combined discrete light spot for each wavelength (260.3 of FIG. 2B) that is "focused" and falls more centrally within the assigned micromirror pixel. Consequently, micromirror curvature effects of the micromirror pixels of SLM 140 are greatly reduced and no light falls on pixel edges or in the intergap regions between the pixels.

It should be noted that the SLM 140 could also be implemented as a pixelated transmissive modulator (one that modulates selected discrete light spots passing through the modulator) so that no light falls on pixel edges or in the intergap regions between the pixels. In such an arrangement the modulated outputs signal from the modulator would be obtained on the right-hand side of the pixels 140.1-140.N of SLM 140 of FIG. 2A.

With continued reference to FIG. 2A, we describe in more detailed an illustrative embodiment operation of our novel WSS 200. PLC 220 is attached to input/output fiber 115 for receiving an input multi-wave optical signal and for outputting an optical signal. The input optical signal is coupled to waveguide array 222, illustratively shown as a Mach-Zehnder interferometer (MZI) consisting of two waveguides. As will be discussed with reference to FIG. 5, waveguide array 222 may be implemented using other types of wavelength routing arrangements utilizing two or more waveguides. One waveguides in waveguide array 222 is longer than the other, with the length difference being related to the free spectral range, which sets the bandwidth of each discrete spot (e.g., 260 of FIG. 2B) in the dispersed light. For illustrative purposes it is assumed that the input multi-wave optical signal is a WDM signal with N channels. At the output of waveguide array 222, there is a 2×2 coupler in which the light from the two waveguides interfere, constructively and destructively depending on the spatial location and the temporal frequency, such that the constructive part is moving spatially with a constant spatial shift per frequency shift. Thus, for modulated wavelength λ3 channel, the constructive interference part produces a light spot 251 that moves with increasing frequency from the lower frequency end of the λ3 channel band 252 to the upper frequency end of the band 253, the center frequency of wavelength λ3 being at the center of the band. The light spot of the moving constructive part 251, or spatial mode, is introduced to coupler 124 of hybrid waveguide array 230. As previously discussed with reference to FIG. 1A, hybrid waveguide array 230 is designed to provide linear dispersion with frequency to a received optical signal. However, since the spatial mode 251 at the input to coupler 124 is shifting as a function of frequency, a scaled replica of this shift is imparted on the linear dispersion produced by hybrid waveguide array 230. By matching the linear dispersion (spatial shift per frequency offset) of hybrid waveguide array 230 to the scaled replica of input mode shift (again, shift per frequency offset over the free spectral range bandwidth) of added waveguide array 222, we essentially can "cancel" out the linear dispersion for one channel or a band of channels so that the resultant spot projected onto a pixel of SLM 140 stays stationary in space for all frequencies over the free spectral range bandwidth of the waveguide array 222. Hence the dispersion of waveguide array 222 essentially cancels the linear dispersion produced by waveguide array 126 and the results in a discrete spot for each wavelength channel of the multi-wave input signal. Since the free spectral range (channel separation) of waveguide array 222 is much smaller than the free spectral range (equal to or greater than N wavelength channel bandwidth) of waveguide array 126, the light incident on SLM 140 will not exhibit the linear dispersion pattern 160 of FIG. 1B, but rather appears as a sequence of discrete spots, or modes, shown as 260.1-260.N of FIG. 2B. Thus, for example λ3 will not exhibit the dispersion pattern for its various spectral components, as shown by 163.1-163.5 of FIG. 1B, but rather the various spectral components will all be spatially located within the one discrete spot, as shown by 260.3 of FIG. 2B. A discrete spot is formed for each of the N wavelength channels, λ1-λN, of the input optical signal. Thus, as we move across the wavelength spectrum, each of the discrete spots e.g., 260.1, will contain all the spectral component spots of their respective modulated wavelength channel, i.e., λ1, before hopping to the next modulated wavelength channel λ2. Each of the sequence of discretely dispersed light spots 260.1-260.N is incident on consecutive pixels 140.1-140.N of SLM 140, as shown in FIG. 2B. This results in each pixel containing only a single beam spot 260, as opposed to continuous linearly dispersed light 160 of the prior art arrangement of FIG. 1B. This is advantageous as pixel edge effects, known to cause deleterious effects, are mitigated. Furthermore, this eliminated the effects of finite pixel curvature, which typically result in temporal dispersion and channel passband limitations.

It should be noted that if SLM is a reflective modulator, the modulated reflection of the single beam spot 260 by a pixel of SLM 140 traverses back through lens 135, couples back through PLC 220 (via waveguide array 126, free space region 124, and waveguide array 222) and emerges on fiber 115. If SLM is a is operated as a switch, the reflection of the single beam spot 260 is not modulated by a pixel of SLM 140, but traverses back through lens 135 in the same manner as described above. If a pixelated modulator that operates in a transmissive mode is used as element 140 (rather than SLM 140) then the single beam spot 260 is modulated as it passes the modulator and then is outputted therefrom.

Figure 3:
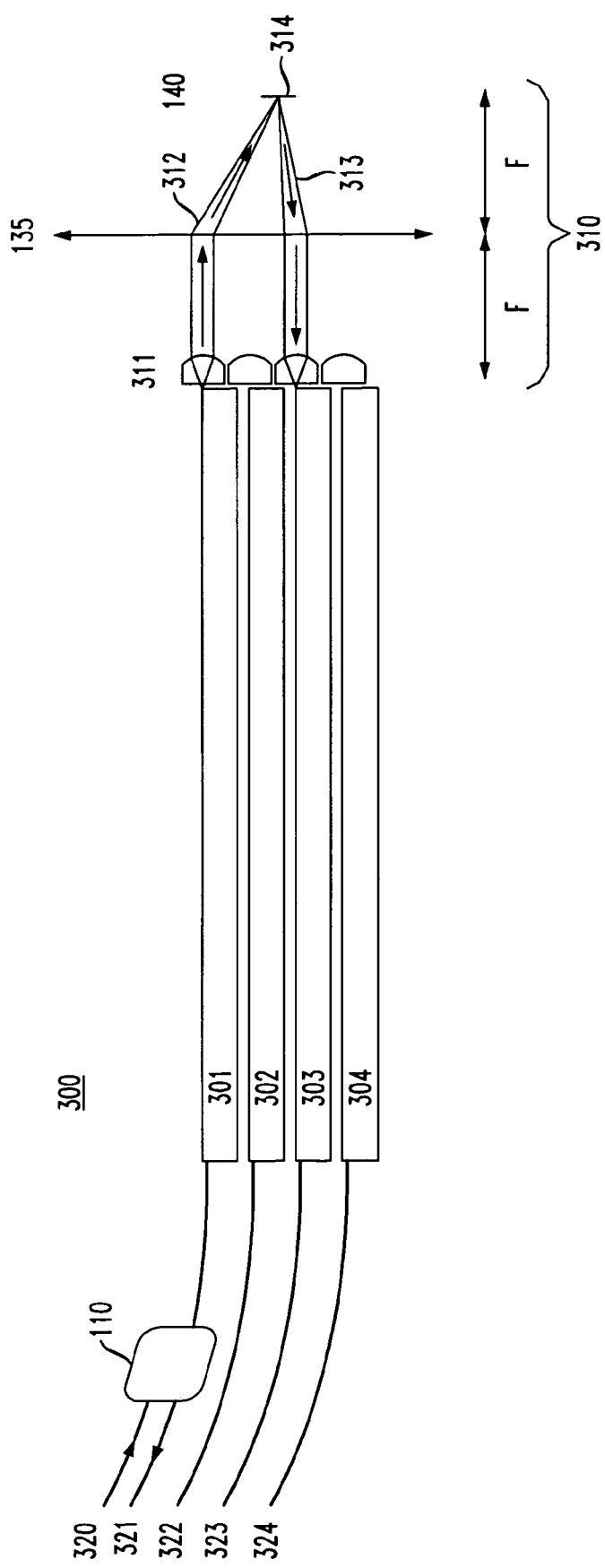
FIG. 3 illustrates a side view of an embodiment of a plurality of our WSS in a stacked arrangement of PLCs.

In accordance with one embodiment of the invention, several of the WSS structure can be stacked together to form a wavelength-selective 1×K switch, which accepts a multiplexed WDM signal at its input port 320 and distributes individual wavelength channels to any one of the K output ports. Shown in FIG. 3 is a side view of an illustrative switch 300 that includes a stack of PLCs 301-301 and a free-space optics configuration 310. The PLCs 301-304 are stacked in perfect registration to each other. The free-space optics configuration 310 subtends the phased array output of all of the PLCs. A similar stacked WSS structure has been disclosed in the previously referenced U.S. patent application Ser. No. 10/930,382. Here each of the PLCs 301-304 are implemented and operate the same as PLC 220 of FIG. 2A. If the first PLC 301 includes a circulator 110 then illustrative switch 300 is a 1×4 switch where the first PLC 301 operates as both an input unit, via input port 320, and one of the output units, via output port 321, to the 1×4 switch. Each of the other PLC 302-304 operates as output units of the 1×4 switch 300, via output ports 322-324.

If the first PLC 301 does not include a circulator 110, then illustrative switch 300 is a 1×3 switch where the first PLC 301 operates only as an input unit, using input port 320, and the PLCs 303-304 operate as output units, using output ports 322-324.

When operated as either a 1×3 or a 1×4 switch, each of the PLCs 301-304 may optionally include a cylindrical collimating lens 311 attached to each PLC to minimize the vertical mode height of the MEMS micromirrors. Shown in FIG. 3 are the incident beam path 312 and the reflected beam path 313 for switching a particular wavelength of the input WDM signal via a particular pixel 314 of SLM 140 to output PLC 303. A control signal to SLM 140 controls the pixel switching (by rotation of the pixel). If the switch 300 is a 1×4 switch (a circulator. 10 at input to PLC 301) then PLC 303 represents the third output of the switch, while if switch 300 is a 1×3 switch PLC 303 represents the second output of the switch. In a similar manner, other wavelengths of the WDM input signal can be switched by their associated pixel of SLM 140 to the same PLC 303 or to one of the other PLCs. As described previously, the input waveguide array 222 on PLC 301 enables PLC 301 and free-space optics configuration 310 to form a discrete spot 260 on a pixel and consequently, makes the beam reflection insensitive to pixel micromirror curvature. In a similar manner as previously described, in switch 300 the reflection of the single beam spot 260 by a pixel of SLM 140 traverses back through lens 135 to the selected PLC and then travels back through that PLC (via waveguide array 126, free space region 124, and waveguide array 222) and emerges at the output port.

Figure 4:
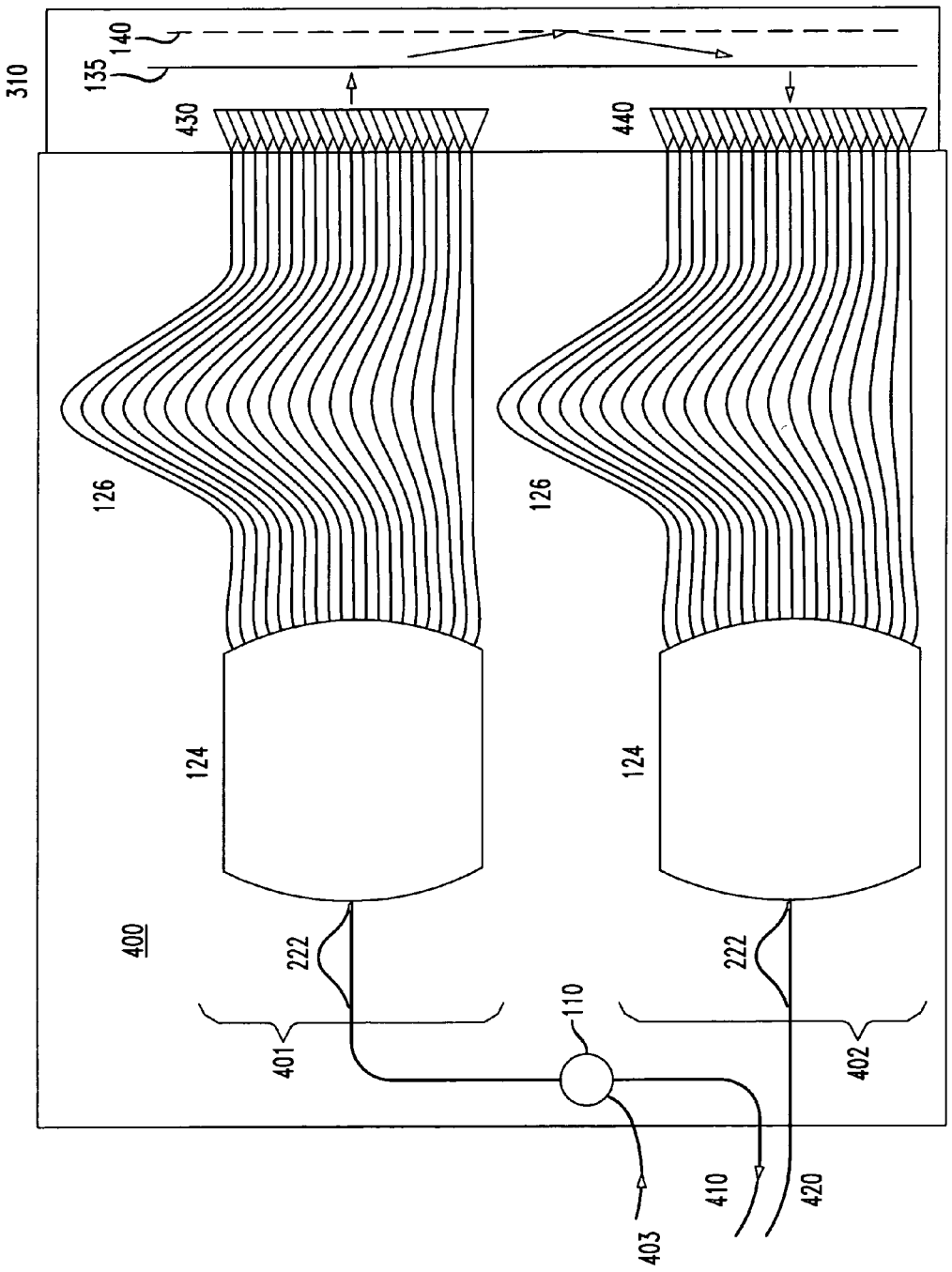
FIG. 4 is an illustration of an alternative embodiment of our WSS using a planar arrangement of multiple PLCs.

With reference to FIG. 4, we describe another one embodiment of the invention where a WSS 400 includes multiple coplanar PLCs 401 and 402. The free-space optics configuration 310 subtends the respective phased array outputs 430 and 440 of PLCs 401 and 402. In this illustrative example WSS 400 is shown as a 1×2 switch, where PLC 401 has a circulator 110 connected in front of it and hence it operates as an input unit, via port 403, and output unit, via output port 410 and PLC 402 is a second output unit with an output port 420. It is well known in the art that constructing a WSS with multiple PLCs 401 and 402 aligned along the same direction as the spatial dispersion results in pixel edge effects causing diffraction that subsequently can couple into the adjacent channels. As previously discussed, by placing waveguide array 222 at the input to coupler 124, the light from the various spectral components of each wavelength channel through PLC 401 can be confined to a single discrete spot at the center of a MEMS micromirror pixel of SLM 140 and, consequently, light is reflected only to the desired port and not to other ports. In a similar manner as previously described, in WSS 400 the reflection of the single beam spot 260 by a pixel of SLM 140 traverses back through lens 135 to the selected PLC (401 or 402) and then travels back through that PLC (via waveguide array 126, free space region 124, and waveguide array 222) and emerges at the output port (410 or 402, respectively).

Figure 5A:
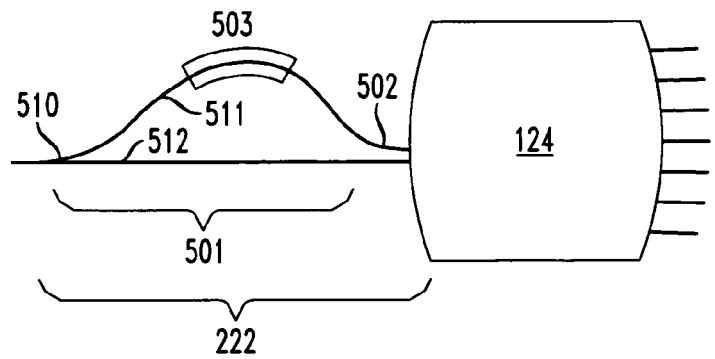
FIGS. 5A through 5C show alternate embodiments of the additional waveguide array utilized in our WSS.
Figure 5B:
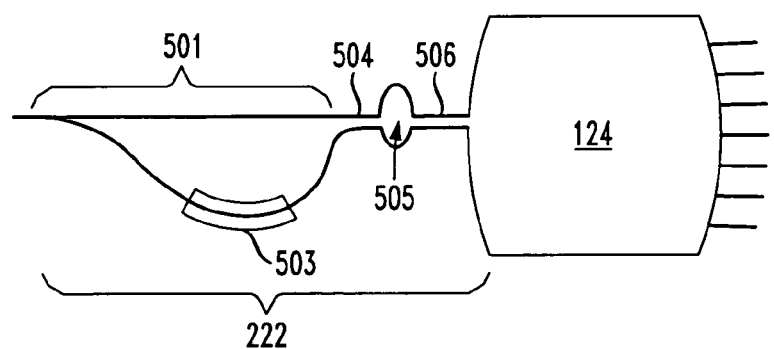
Figure 5C:
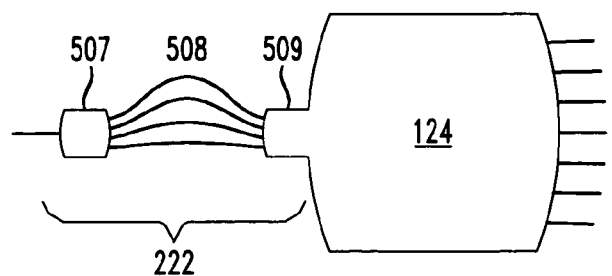

With reference to FIGS. 5A through SC we describe various implementation of waveguide array 222. In FIG. 5A the waveguide array 222 is shown as a wavelength router 501 that illustratively includes an optical coupler 510, waveguide arms 511, 512, and a 90 degree coupler 502. As shown wavelength router 501 forms a Mach-Zhender interferometer (MZI) 501 (with its longer arm on top) coupled through a 90-degree coupler 502 to free space region 124. Optionally, MZI 501 may include an optical-phase adjuster 503 in either of the two arms, in order to wavelength-align MZI 501 with the hybrid waveguide array 230. In FIG. 5B, the waveguide array 222 includes a MZI 501 (with its longer arm on bottom) coupled through a 180 degree coupler 503, an adjustable phase shifter 504, and a 90 degree coupler 505 which connects to free space region 124. Such an arrangement is described in U.S. Pat. No. 6,728,446, which description is incorporated by reference herein. In FIG. 5C, the waveguide array 222 is formed using a waveguide grating router including a first free space region 507 connected by a plurality of incrementally longer arms 508 (increasingly longer arms on top) to a second free space region 509, which connects to free space region 124.

In accordance with the present invention, we describe a method of operating an optical switch comprising the steps of (1) receiving a multi-wave light signal into a waveguide of a wavelength selective switch; (2) coupling the light beam into a first waveguide array having a free-spectral range equal to the channel separation of the multi-wave light signal and which introduces a first dispersion into the multi-wave light signal; (3) coupling the light beam from the first waveguide array to a second waveguide array having a free-spectral range equal to all of the channels of the multi-wave light signal and that introduces a second dispersion into the multi-wave light signal which adds onto the first dispersion, the second waveguide array terminates at an edge facet and generates a phased array output; (4) spatially Fourier transforming the phased array output using one or more lenses to generate a spectrally resolved image having a discrete light spot for each wavelength channel of the multi-wave light signal.

It will be appreciated by those skilled in the art that changes could be made to the embodiments described above without departing from the broad inventive concept thereof. For example, each PLC may comprise multiple input/output waveguides coupled to multiple waveguide arrays, as shown in FIG. 4, to significantly increase the port count of an optical switch without significantly increasing the complexity of the switch. Also, it will be appreciated that various combinations of lenses may be used to spatially Fourier transform a phased array output from the waveguide array(s) of a PLC. Additionally, a single linear array of micro electromechanical systems (MEMS) micromirrors may be used as the reflector device to reflect and direct one or more selected spectral components of the spectrally resolved image generated by the lens(es). Further, it is understood that additional elements may be added to one or more of the PLCs to allow the optical switching apparatus to perform more operations on light beams propagated through the apparatus. Some examples of such operations include, but are not limited to, implementing a multi-fiber single channel or banded channel multiplexer/demultiplexer, chromatic dispersion and/or polarization mode dispersion compensation, and other operations known in the field of planar lightwave circuits.

It is understood, therefore, that this invention is not limited to the particular embodiments disclosed, but it is intended to cover modifications within the spirit and scope of the present invention as defined by the appended claims.

We claim:

1. An optical apparatus for receiving a multi-wave input optical signal comprising:
    a first planar lightwave circuit (PLC) including:
        a single input/output waveguide for receiving the multi-wavelength input optical signal, and for outputting one or more output optical signals,
        a first waveguide array having a first waveguide coupler, a second waveguide coupler and at least two waveguides optically connecting the first and second couplers, wherein the first coupler is physically connected, and directly coupled optically without intervention, to the input/output waveguide, and wherein said first array exhibits a free-spectral range equal to the channel separation of the input optical signal, and introduces a first dispersion into the input optical signal,
        a second waveguide array including an input waveguide coupler, wherein the input coupler is physically connected, and directly coupled optically without intervention, to the second coupler of the first waveguide array, and wherein the second waveguide array has a plurality of waveguides terminating at an edge facet of the PLC, and exhibits a free-spectral range equal to all of the channels of the input optical signal, and produces a second dispersion into the input optical signal which adds to the first dispersion;
    a lens adjacent to the PLC; and
    an optical receiving unit adjacent to the lens;
    wherein the edge facet of the PLC and the optical receiving unit are respectively positioned at a front focal plane and a back focal plane of the lens such that an input optical signal is propagated through the PLC to generate a phased array output at the edge facet of the PLC, the phased array output is spatially Fourier transformed by the lens to generate a spectrally resolved image having a discrete or somewhat discrete light spot for each channel or band of channels of the input optical signal on to the optical receiving unit.

2. The apparatus of claim 1, wherein the optical receiving unit is a reflector device including a micromirror array for selectively reflecting one or more discrete light spots.

3. The apparatus of claim 1, wherein the optical receiving unit is a liquid crystal modulator array to modulate the reflection of selected one or more discrete light spots.

4. The apparatus of claim 1, wherein the optical output device is a pixelated modulator to modulate the transmission of selected one or more discrete light spots through the modulator.

5. The apparatus of claim 1, wherein the first waveguide array is a Mach-Zehnder interferometer.

6. The apparatus of claim 1, wherein the first waveguide array is a waveguide grating router.

7. The optical apparatus of claim 2, further comprising:
    at least one additional PLC arranged in a stacked configuration with the first PLC;
    each additional PLC including;
        a single input/output waveguide for receiving the multi-wavelength input optical signal, and for outputting one or more output optical signals,
        a first waveguide array having at least two waveguides connecting a first waveguide coupler and a second waveguide coupler, wherein the first coupler is physically connected, and directly coupled optically without intervention, to the input/output waveguide, and wherein the first waveguide array exhibits a free-spectral range equal to the channel separation,
        a second waveguide array having an input waveguide coupler coupled to a plurality of waveguides terminating at an edge facet of the additional PLC and having a free-spectral range equal to the bandwidth of the multiple channels of the input optical signal, wherein the input coupler is physically connected, and directly coupled optically without intervention, to the second coupler of the first wave guide array, and
    wherein the reflector device is a tilting micromirror array that selectively reflects discrete light spots of the input optical signal thereby providing wavelength-selective switching of one or more channels of the input optical signal from the first PLC through the second and the first waveguide arrays respectively, of one of the at least one additional PLC to the single input/output waveguide of the one of the at least one additional PLC.

8. The optical apparatus of claim 2 further comprising;
    at least one additional PLC arranged in a side-by-side planar configuration with the first PLC;
    each additional PLC including;
        a single input/output waveguide for receiving the multi-wavelength input optical signal, and for outputting one or more output optical signals,
        a first waveguide array having at least two waveguides connecting a first waveguide coupler and a second waveguide coupler, wherein the first coupler is physically connected, and directly coupled optically without intervention, to the input/output waveguide, and wherein the first waveguide array exhibits a free-spectral range equal to the channel separation,
        a second waveguide array having an input waveguide coupler coupled to a plurality of waveguides terminating at an edge facet of the additional PLC and having a free-spectral range equal to or greater than all of the channels of the input optical signal wherein the input coupler is physically connected, and directly coupled optically without intervention, to the second coupler of the first wave guide array, and wherein the reflector device is a tilting micromirror array that selectively reflects one or more discrete light spots of the input optical signal thereby providing wavelength-selective switching of one or more channels of the input optical signal from the first PLC through the second and the first waveguide arrays respectively, of one of the at least one additional PLC to the single input/output waveguide of the one of the at least one additional PLC.

9. A method for optical switching comprising the steps of:

receiving a multi-wavelength light signal into a single input/output waveguide of a wavelength selective switch;

coupling the light beam directly without intervention from the input/output waveguide into a first waveguide coupler of a first waveguide array having a free-spectral range equal to the channel separation of the multi-wavelength light signal, wherein said first waveguide array including the first waveguide coupler, a second waveguide coupler and at least two waveguides optically connecting the first coupler to the second coupler introduces a first dispersion into the multi-wavelength light signal;

coupling the light beam output directly without intervention, from the second coupler of the first waveguide array to an input waveguide coupler included in a second waveguide array having a free-spectral range equal to or greater than all of the channels of the multi-wavelength light signal, wherein the second waveguide array introduces a second dispersion into the multi-wave light signal which periodically cancels the first dispersion, and wherein the second waveguide array terminates at an edge facet of the PLC and generates a phased array output;

spatially Fourier transforming the phased array output using one or more lenses to generate a spectrally resolved image having a discrete light spot for each channel of the multi-wave light signals, reflecting selectively, the discrete light spots for one or more channels through a reflecting receiving unit, and coupling at least one of the selectively reflected discrete light spots through the second and the first waveguide arrays respectively, to the input/output waveguide of the PLC.

* * * * *